US012750126B2

United States Patent
Kim

(10) Patent No.: US 12,750,126 B2
(45) Date of Patent: Sep. 29, 2026

(54) METHOD AND APPARATUS FOR TIMING MANAGEMENT IN COMMUNICATION SYSTEM

(71) Applicant: ELECTRONICS AND TELECOMMUNICATIONS RESEARCH INSTITUTE, Daejeon (KR)

(72) Inventor: Ji Hyung Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 186 days.

(21) Appl. No.: 17/507,847

(22) Filed: Oct. 22, 2021

(65) Prior Publication Data

US 2022/0131599 A1 Apr. 28, 2022

(30) Foreign Application Priority Data

Oct. 23, 2020 (KR) ........................ 10-2020-0138550
Jan. 15, 2021 (KR) ........................ 10-2021-0006301
Oct. 8, 2021 (KR) ........................ 10-2021-0134166

(51) Int. Cl.
*H04B 7/185* (2006.01)
*H04L 43/0864* (2022.01)
(Continued)

(52) U.S. Cl.
CPC ..... *H04B 7/18513* (2013.01); *H04L 43/0864* (2013.01); *H04W 24/04* (2013.01); *H04W 74/0833* (2013.01)

(58) Field of Classification Search
CPC ........... H04B 7/18513; H04L 43/0864; H04W 24/04; H04W 74/0833; H04W 56/0045; H04W 56/006
See application file for complete search history.

(56) References Cited

U.S. PATENT DOCUMENTS 9,900,856 B2 2/2018 Wu et al.
2019/0313357 A1 10/2019 Wang et al.
(Continued)

FOREIGN PATENT DOCUMENTS

CN 111615186 A 9/2020
EP 3272032 A1 1/2018

OTHER PUBLICATIONS

3GPP TR 22.829 v17.1.0 (Sep. 2019), "3rd Generation Partnership Project; Technical Specification Group Services and System Aspects; Enhancement for Unmanned Aerial Vehicles; Stage 1 (Release 17)".
(Continued)

*Primary Examiner* — Asad M Nawaz
*Assistant Examiner* — Najeeb Ansari
(74) *Attorney, Agent, or Firm* — Rabin & Berdo, P.C.

(57) ABSTRACT

An operation method of a terminal may comprise: receiving information on a common delay time between the terminal and the base station and information on a PRACH occasion through a service link established between the terminal and the satellite; calculating a first adjustment value based on the common delay time; transmitting a PRACH preamble through the service link at a first timing earlier by the first adjustment value than the PRACH occasion; receiving a random access response (RAR); calculating a second adjustment value based on the common delay time; and transmitting an uplink signal through the service link at a second timing later by the second adjustment value than the response delay time.

12 Claims, 7 Drawing Sheets

(51) Int. Cl.
*H04W 24/04* (2009.01)
*H04W 74/0833* (2024.01)

(56) References Cited

U.S. PATENT DOCUMENTS

| | | | | |
|---|---|---|---|---|
| 2019/0394770 | A1 | 12/2019 | Wang et al. | |
| 2020/0153500 | A1 | 5/2020 | Kim et al. | |
| 2020/0351957 | A1 | 11/2020 | Kim | |
| 2021/0029658 | A1 | 1/2021 | Mahalingam et al. | |
| 2021/0251012 | A1* | 8/2021 | Shrestha | H04W 74/0833 |
| 2022/0086780 | A1* | 3/2022 | Tsai | H04W 56/006 |
| 2022/0124795 | A1* | 4/2022 | Wu | H04W 56/0045 |
| 2022/0174635 | A1* | 6/2022 | Ryu | H04W 56/0045 |
| 2022/0255620 | A1* | 8/2022 | Wang | H04B 7/18513 |
| 2022/0386263 | A1* | 12/2022 | Miao | H04L 5/0091 |
| 2022/0408389 | A1* | 12/2022 | Wang | H04W 56/0045 |
| 2023/0189088 | A1* | 6/2023 | Shin | H04W 36/08<br>455/427 |

OTHER PUBLICATIONS

3GPP TR 38.811 V15.3.0 (Jul. 2020), "3rd Generation Partnership Project; Technical Specification Group Radio Access Network; Study on New Radio (NR) to support non-terrestrial networks (Release 15)The present".

3GPP TR 38.821 V16.0.0 (Dec. 2019), "3rd Generation Partnership Project; Technical Specification Group Radio Access Network; Solutions for NR to support non-terrestrial networks (NTN) (Release 16)".

3GPP TS 38.104 V16.4.0 (Jun. 2020), "3rd Generation Partnership Project; Technical Specification Group Radio Access Network; NR; Base Station (BS) radio transmission and reception (Release 16)".

3GPP TS 38.133 V16.4.0 (Jun. 2020), "3rd Generation Partnership Project; Technical Specification Group Radio Access Network; NR; Requirements for support of radio resource management (Release 16)".

3GPP TS 38.211 V16.2.0 (Jun. 2020), "3rd Generation Partnership Project; Technical Specification Group Radio Access Network; NR; Physical channels and modulation (Release 16)".

3GPP TS 38.212 V16.2.0 (Jun. 2020), "3rd Generation Partnership Project; Technical Specification Group Radio Access Network; NR; Multiplexing and channel coding (Release 16)".

3GPP TS 38.213 V16.2.0 (Jun. 2020), "3rd Generation Partnership Project; Technical Specification Group Radio Access Network; NR; Physical layer procedures for control (Release 16)".

3GPP TS 38.214 V16.2.0 (Jun. 2020), "3rd Generation Partnership Project; Technical Specification Group Radio Access Network; NR; Physical layer procedures for data (Release 16)".

3GPP TS 38.321 V16.1.0 (Jul. 2020), "3rd Generation Partnership Project; Technical Specification Group Radio Access Network; NR; Medium Access Control (MAC) protocol specification (Release 16)".

3GPP TS 38.331 V16.1.0 (Jul. 2020), "3rd Generation Partnership Project; Technical Specification Group Radio Access Network; NR; Radio Resource Control (RRC) protocol specification (Release 16)".

* cited by examiner

METHOD AND APPARATUS FOR TIMING MANAGEMENT IN COMMUNICATION SYSTEM

CROSS-REFERENCE TO RELATED APPLICATIONS

This application claims priority to Korean Patent Applications No. 10-2020-0138550, filed on Oct. 23, 2020, No. 10-2021-0006301 filed on Jan. 15, 2021, and No. 10-2021-0134166 filed on Oct. 8, 2021 with the Korean Intellectual Property Office (KIPO), the entire contents of which are hereby incorporated by reference.

BACKGROUND

1. Technical Field

The present disclosure relates to a technique for timing management in a communication system, and more particularly, to a timing management technique in a communication system for timing management between a terminal and a base station in long-distance communication.

2. Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

Meanwhile, a mobile satellite communication technology may be required in preparation for a communication interruption that may occur in cellular shadow areas such as mountainous areas, desert areas, island areas, and the sea, and in areas where a terrestrial network collapses due to various disasters such as earthquakes, tsunamis, and wars. Since a satellite communication network is maintained even when the terrestrial network collapses due to a disaster, a disaster area may not be disconnected from the outside, making it possible to maintain individual survival and safety. In addition, the mobile satellite communication technology may be required for the establishment of a hyper-connected society by providing mobile communication services even in areas where communication was not possible, such as mountainous areas and remote areas without a communication infrastructure.

The 3GPP is in the process of standardization on a non-terrestrial network (NTN) using a non-terrestrial base station (e.g., a satellite base station or a base station using an airborne platform such as an airship) based on the 5G NR technology. When the non-terrestrial base station is a satellite base station, a distance between the satellite base station and a terminal may be a long distance, and a position of the satellite base station may be continuously changed. Such the non-terrestrial network may have a relatively long round trip time delay (RTT) and a high Doppler shift environment compared to terrestrial communication. In such the non-terrestrial network, a long round trip delay time and movement of a base station may affect various procedures of data transmission and reception. Accordingly, when the terminals do not perform proper timing adjustment, there may be a large difference in timings at which signals from terminals located at various distances arrive at the base station.

SUMMARY

Accordingly, exemplary embodiments of the present disclosure are directed to providing timing management methods and apparatuses in a mobile communication system for timing management between a terminal and a base station in consideration of a long round-trip delay time and a movement of the base station in a non-terrestrial network (NTN).

According to a first exemplary embodiment of the present disclosure, an operation method of a terminal, in a communication system including the terminal, a satellite, and a base station, may comprise: receiving information on a common delay time between the terminal and the base station and information on a physical random access channel (PRACH) occasion through a service link established between the terminal and the satellite; calculating a first adjustment value based on the common delay time; transmitting a PRACH preamble through the service link at a first timing earlier by the first adjustment value than the PRACH occasion; receiving a random access response (RAR) including information on a response delay time of the base station through the service link; calculating a second adjustment value based on the common delay time; and transmitting an uplink signal through the service link at a second timing later by the second adjustment value than the response delay time, wherein a feeder link is established between the satellite and the base station, and the satellite relays communication between the terminal and the base station.

The information on the common delay time may include at least one of a first round-trip delay time (RTT) parameter representing an RTT between the terminal and the satellite, a second RTT parameter representing an RTT between the satellite and the base station, a third RTT parameter obtained by summing the second RTT parameter to the RTT parameter, or a fourth RTT parameter obtained by adding a first margin to the third RTT parameter, and the first margin may be set in units of symbols.

The operation method may further comprise: receiving information on a time stamp, which is a timing of transmitting a downlink signal from the satellite, through the service link; identifying a timing of receiving the downlink signal; estimating an RTT between the terminal and the satellite by using the timing of receiving the downlink signal and the time stamp to generate an estimated RTT parameter; and replacing the first RTT parameter with the estimated RTT parameter.

The terminal may calculate the first adjustment value by subtracting a second margin from one of the first RTT parameter to the fourth RTT parameter, and the second margin may be set in units of symbols.

The receiving of the RAR may comprise: starting monitoring for receiving the RAR at a third timing obtained by adding a third adjustment value to a random access offset after transmitting the PRACH preamble; and receiving the RAR including information on the response delay time through the service link.

The operation method may further comprise: detecting a beam failure; transmitting a beam failure recovery request signal through the service link; monitoring a beam failure recovery response signal after an offset time reflecting the information on the common delay time from a timing of transmitting the beam failure recovery request signal; and receiving the beam failure recovery response signal through the service link.

According to a second exemplary embodiment of the present disclosure, an operation method of a terminal, in a communication system including the terminal, a satellite, and a base station, may comprise: receiving information on a time stamp which is a timing of transmitting a downlink signal from the satellite, and information on a round trip delay time (RTT) between the base station and the satellite through a service link established between the terminal and the satellite; calculating a first estimated value by estimating an RTT between the terminal and the base station by using the time stamp and the RTT between the base station and the satellite; determining whether the first estimated value is within a threshold range; and in response to determining that the first estimated value is within the threshold range, transmitting a preamble through the service link, wherein a feeder link is established between the satellite and the base station, and the satellite relays communication between the terminal and the base station.

The calculating of the first estimated value may comprise: identifying a timing of receiving the downlink signal; estimating the RTT between the terminal and the satellite by using the timing of receiving the downlink signal and the time stamp to generate an estimated RTT parameter; and calculating the first estimated value by summing the estimated RTT between the terminal and the satellite and the RTT between the base station and the satellite.

The operation method may further comprise: in response to determining that the first estimated value is not within the threshold range, determining whether the transmission of the preamble is a retransmission; and in response to determining that the transmission of the preamble is a retransmission, retransmitting the preamble through the service link by using a second estimated value that is an RTT estimated before a retransmission timing.

The retransmitting of the preamble through the service link may comprise: determining whether the second estimated value is within a first time window period preceding the retransmission timing; and in response to determining that the second estimated value is within the first time window period, transmitting the preamble through the service link by using the second estimated value.

According to a third exemplary embodiment of the present disclosure, a terminal in a communication including the terminal, a satellite, and a base station may comprise: a processor; a memory electronically communicating with the processor; and instructions stored in the memory, wherein when executed by the processor, the instructions cause the terminal to: receive information on a common delay time between the terminal and the base station and information on a physical random access channel (PRACH) occasion through a service link established between the terminal and the satellite; calculate a first adjustment value based on the common delay time; transmit a PRACH preamble through the service link at a first timing earlier by the first adjustment value than the PRACH occasion; receive a random access response (RAR) including information on a response delay time of the base station through the service link; calculate a second adjustment value based on the common delay time; and transmit an uplink signal through the service link at a second timing later by the second adjustment value than the response delay time, wherein a feeder link is established between the satellite and the base station, and the satellite relays communication between the terminal and the base station.

The information on the common delay time may include at least one of a first round-trip delay time (RTT) parameter representing an RTT between the terminal and the satellite, a second RTT parameter representing an RTT between the satellite and the base station, a third RTT parameter obtained by summing the second RTT parameter to the RTT parameter, or a fourth RTT parameter obtained by adding a first margin to the third RTT parameter, and the first margin may be set in units of symbols.

The instructions may further cause the terminal to: receive information on a time stamp, which is a timing of transmitting a downlink signal from the satellite, through the service link; identify a timing of receiving the downlink signal; estimate an RTT between the terminal and the satellite by using the timing of receiving the downlink signal and the time stamp to generate an estimated RTT parameter; and replace the first RTT parameter with the estimated RTT parameter.

In the receiving of the RAR, the instructions may further cause the terminal to: start monitoring for receiving the RAR at a third timing obtained by adding a third adjustment value to a random access offset after transmitting the PRACH preamble; and receive the RAR including information on the response delay time through the service link.

The instructions may further cause the terminal to: detect a beam failure; transmit a beam failure recovery request signal through the service link; monitor a beam failure recovery response signal after an offset time reflecting the information on the common delay time from a timing of transmitting the beam failure recovery request signal; and receive the beam failure recovery response signal through the service link.

According to exemplary embodiments of the present disclosure, timing synchronization between a base station and a terminal may be efficiently maintained by reflecting a common delay between the base station and terminals. In addition, the terminal may transmit a preamble to the base station at a timing earlier than a physical random access channel (PRACH) occasion in a random access procedure, thereby preventing a delay of the preamble signal due to a round trip delay time between the base station and the terminal.

Further, the terminal may start monitoring a preamble response signal at a timing later than a response delay time in the random access procedure to prevent unnecessary power consumption. In addition, the terminal may transmit the preamble when an estimated value reflecting the round trip delay time with the base station is within a predetermined threshold range, thereby preventing unnecessary transmission operations from occurring.

DETAILED DESCRIPTION OF THE EMBODIMENTS

Figure 1:
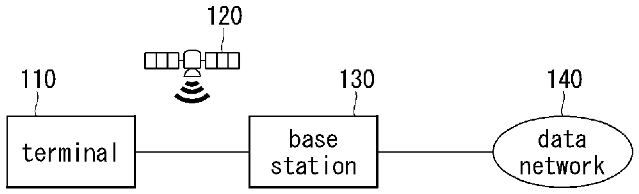
FIG. 1 is a conceptual diagram illustrating a first exemplary embodiment of a non-terrestrial network.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication network to which exemplary embodiments according to the present disclosure are applied will be described. The communication network may be a non-terrestrial network (NTN), a 4G communication network (e.g., long-term evolution (LTE) communication network), a 5G communication network (e.g., new radio (NR) communication network), and/or the like. The 4G communication network and 5G communication network may be classified as terrestrial networks.

The NTN may operate based on the LTE technology and/or NR technology. The NTN may support communication in a frequency band of 6 GHz or above as well as a frequency band of 6 GHz or below. The 4G communication network may support communications in a frequency band of 6 GHz or below. The 5G communication network may support communications not only in a frequency band of 6 GHz or below, but also in a frequency band of 6 GHz or above. A communication network to which exemplary embodiments according to the present disclosure are applied is not limited to the contents described below, and exemplary embodiments according to the present disclosure may be applied to various communication networks. Here, a communication network may be used in the same meaning as a communication system.

Throughout the present disclosure, a 'network' may include, for example, a wireless Internet such as Wi-Fi, a portable Internet such as wireless broadband internet (WiBro) or world interoperability for microwave access (WiMax), a 3rd generation (3G) mobile communication network such as global system for mobile communication (GSM), code division multiple access (CDMA), or CDMA2000, a 3.5th generation (3.5G) mobile communication network such as high speed downlink packet access (HSDPA) or high speed uplink packet access (HSUPA), a 4th generation (4G) mobile communication network such as long term evolution (LTE) or LTE-Advanced, a 5th generation (5G) mobile communication network, and/or the like.

Throughout the present disclosure, a 'terminal' may refer to a mobile station, mobile terminal, subscriber station, portable subscriber station, user equipment, access terminal, and/or the like, and may include all or some functions of the terminal, mobile station, mobile terminal, subscriber station, portable subscriber station, user equipment, access terminal, and/or the like.

The terminal may refer to a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video player, or the like that has communication capability and that a mobile communication service user can use.

Throughout the present disclosure, a 'base station' may refer to an access point, radio access station, NodeB, evolved NodeB, base transceiver station, mobile multi-hop relay-base station (MMR-BS), and/or the like, and may include all or some functions of the base station, access point, wireless access station, NodeB, evolved NodeB, base transceiver station, MMR-BS, and/or the like.

Hereinafter, exemplary embodiments will be described with reference to the 3GPP NR mobile communication system, and the following references ([1] to [11]) that define the operations of the 3GPP NR mobile communication system may be cited.

Reference [1] 3GPP TS 38.211 V16.2.0, "3rd Generation Partnership Project; Technical Specification Group Radio Access Network; NR; Physical channels and modulation (Release 16)"

Reference [2] 3GPP TS 38.212 V16.2.0, "3rd Generation Partnership Project; Technical Specification Group Radio Access Network; NR; Multiplexing and channel coding (Release 16)"

Reference [3] 3GPP TS 38.213 V16.2.0, "3rd Generation Partnership Project; Technical Specification Group Radio Access Network; NR; Physical layer procedures for data (Release 16)"

Reference [4] 3GPP TS 38.214 V16.2.0, "3rd Generation Partnership Project; Technical Specification Group Radio Access Network; NR; Physical layer procedures for data (Release 16)"

Reference [5] 3GPP TS 38.321 V16.1.0, "3rd Generation Partnership Project; Technical Specification Group Radio Access Network; NR; Medium Access Control (MAC) protocol specification (Release 15)"

Reference [6] 3GPP TS 38.331 V16.1.0, "3rd Generation Partnership Project; Technical Specification Group Radio Access Network; NR; Radio Resource Control (RRC) protocol specification (Release 15)"

Reference [7] 3GPP TS 38.133 V16.4.0, "3rd Generation Partnership Project; Technical Specification Group Radio Access Network; NR; Requirements for support of radio resource management (Release 16)"

Reference [8] 3GPP TS 38.104 V16.4.0, "3rd Generation Partnership Project; Technical Specification Group Radio Access Network; NR; Base Station (BS) radio transmission and reception (Release 16)"

Reference [9] 3GPP TR 38.811 V15.3.0, "3rd Generation Partnership Project; Technical Specification Group Radio Access Network; Study on New Radio (NR) to support non-terrestrial networks (Release 15)"

Reference [10] 3GPP TR 38.821 V16.0.0, "3rd Generation Partnership Project; Technical Specification Group Radio Access Network; Solutions for NR to support non-terrestrial networks (NTN) (Release 16)"

Reference [11] 3GPP TR 22.829 V17.1.0, "3rd Generation Partnership Project; Technical Specification Group Services and System Aspects; Enhancement for Unmanned Aerial Vehicles; Stage 1 (Release 17)"

FIG. 1 is a conceptual diagram illustrating a first exemplary embodiment of a non-terrestrial network.

Referring to FIG. 1, an NTN may include a terminal 110, a satellite 120, a base station 130, and a data network 140. Such the NTN may be implemented in a structure where a non-terrestrial base station is installed in the satellite 120 or an air transportation means between the terminal 110 and the base station 130 to relay communications between the terminal 110 and the base station 130.

Figure 2:
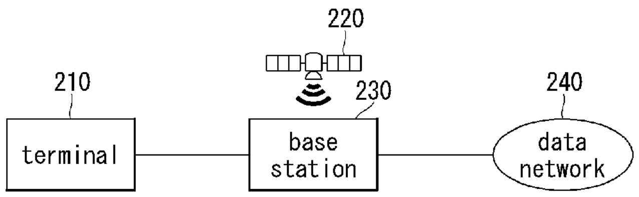
FIG. 2 is a conceptual diagram illustrating a second exemplary embodiment of a non-terrestrial network.

FIG. 2 is a conceptual diagram illustrating a second exemplary embodiment of a non-terrestrial network.

Referring to FIG. 2, an NTN may include a terminal 210, a satellite 220, a base station 230, and a data network 240. Such the NTN may be implemented in a structure where a non-terrestrial base station installed in the satellite 120 or an air transportation means performs some or all of functions of the base station 230 so that the terminal 210 and the base station 230 perform communications.

Figure 3:
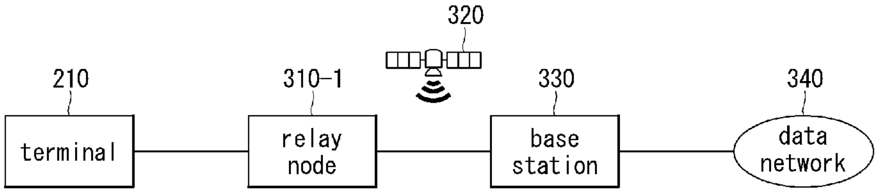
FIG. 3 is a conceptual diagram illustrating a third exemplary embodiment of a non-terrestrial network.

FIG. 3 is a conceptual diagram illustrating a third exemplary embodiment of a non-terrestrial network.

Figure 4:
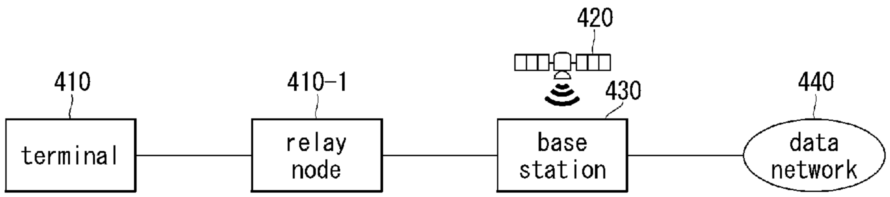
FIG. 4 is a conceptual diagram illustrating a fourth exemplary embodiment of a non-terrestrial network.

Referring to FIG. 4, an NTN may include a terminal 310, a relay node 310-1, a satellite 320, a base station 330, and a data network 340. Such the NTN may be implemented in a structure where a non-terrestrial base station is installed in the satellite 320 or an air transportation means between the relay node 310-1 and the base station 330 to relay communications.

FIG. 4 is a conceptual diagram illustrating a fourth exemplary embodiment of a non-terrestrial network.

Referring to FIG. 4, an NTN may include a terminal 410, a relay node 410-1, a satellite 420, a base station 430, and a data network 440. Such the NTN may be implemented in a structure where a non-terrestrial base station installed in the satellite 420 or an air transportation means performs some or all of functions of the base station 430 so that the relay node 410-1 and the base station 430 perform communications.

Here, each of the satellites 120, 220, 320, and 420 may be a transparent satellite (e.g., low earth orbit (LEO), medium earth orbit (MEO), geostationary equatorial orbit (GEO), etc.) or high-altitude platform station system (HAPS). Alternatively, each of the satellites 120, 220, 320, and 420 may be a regenerative satellite (e.g., LEO, MEO, GEO, etc.) or HAPS. As described in References [9] and [10], the transparent satellite may perform a role of a relay of a base station, and the regenerative satellite may perform a role of a base station. For convenience of description, a 'satellite base station' may be used as a term representing a non-terrestrial base station or a mobile base station. In addition, hereinafter, a satellite may include an unmanned aerial vehicle described in Reference [11].

As shown in FIGS. 1 to 4, a service link may be established between each of the satellites 120, 220, 320, and 420 and each of the terminals 110, 210, 310, and 410, and the service link may be a radio link. Each of the satellites 120, 220, 320, and 420 may provide communication services to each of the terminals 110, 210, 310, and 410 by using one or more beams. A footprint of the beam of the satellites 120, 220, 320, and 420 may have an elliptical shape.

The terminals 110, 210, 310, and 410 may perform communications (e.g., downlink communication, uplink communication) with the satellites 120, 220, 320, and 420 by using the LTE technology and/or NR technology. The communications between the satellites 120, 220, 320, and 420 and the terminals 110, 210, 310, and 410 may be performed using NR-Uu interfaces. When dual connectivity (DC) is supported, the terminal 110, 210, 310, or 410 may be connected with not only the satellite 120, 220, 320, or 420 but also another base station (e.g., base station supporting LTE and/or NR functions), and may perform DC operations based on the technology defined in LTE and/or NR specifications. Meanwhile, the base station 130, 230, 330, or 430 may be connected to the data network 140, 240, 340, or 440. The base stations 130, 230, 330, or 430 and the data networks 140, 240, 340, or 440 may support the NR technology. Communications between the base stations 130, 230, 330, and 430 and the data networks 140, 240, 340, and 440 may be performed based on NG-C/U interfaces. The base stations 130, 230, 330, and 430 may be conventional base stations in terrestrial communication, or satellite base stations described in References [9] and [10].

Meanwhile, entities (e.g., satellites, terminals, base stations, etc.) constituting the NTNs shown in FIGS. 1 to 4 may be configured as follows.

Figure 5:
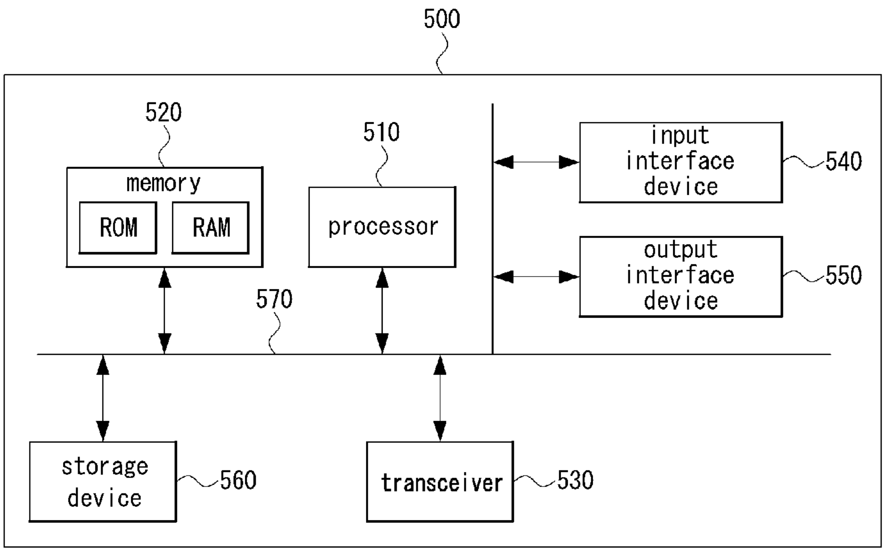
FIG. 5 is a block diagram illustrating a first exemplary embodiment of entities constituting a non-terrestrial network.

FIG. 5 is a block diagram illustrating a first exemplary embodiment of entities constituting a non-terrestrial network.

Referring to FIG. 5, an entity 500 may comprise at least one processor 510, a memory 520, and a transceiver 530 connected to a network for performing communications. Also, the entity 500 may further comprise an input interface device 540, an output interface device 550, a storage device 560, and the like. The components included in the entity 500 may communicate with each other as connected through a bus 570.

However, each component included in the entity 500 may not be connected to the common bus 570 but may be connected to the processor 510 via an individual interface or a separate bus. For example, the processor 510 may be connected to at least one of the memory 520, the transceiver 530, the input interface device 540, the output interface device 550 and the storage device 560 via a dedicated interface.

The processor 510 may execute a program stored in at least one of the memory 520 and the storage device 560. The processor 510 may refer to a central processing unit (CPU), a graphics processing unit (GPU), or a dedicated processor on which methods in accordance with embodiments of the present disclosure are performed. Each of the memory 520 and the storage device 560 may be constituted by at least one of a volatile storage medium and a non-volatile storage medium. For example, the memory 520 may comprise at least one of read-only memory (ROM) and random access memory (RAM).

1. Monitoring of a Terminal and Parameters Related Thereto

The base station may deliver delay time parameters corresponding to a common delay (CD) to a terminal through a master information block (MIB) or a system information block (SIB).

Figure 6:
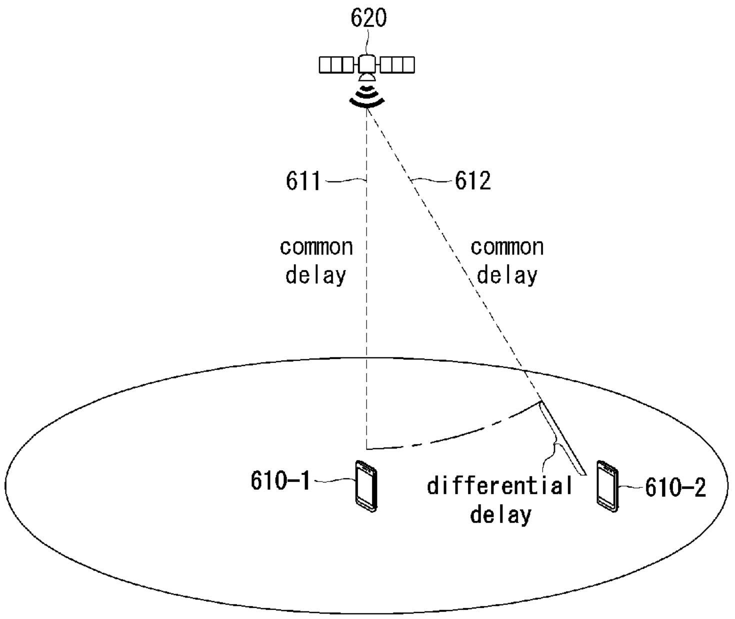
FIG. 6 is a conceptual diagram illustrating a common delay time and a differential delay time according to a location of a terminal in long-distance communication.

FIG. 6 is a conceptual diagram illustrating a common delay time and a differential delay time according to a location of a terminal in long-distance communication.

Referring to FIG. 6, a common delay time may be a round trip delay time (RTT) according to a distance 611 between a satellite 620 and a terminal 610-1 located in the vertical direction from the satellite 620 within a coverage of the satellite 620. In addition, a differential delay time may be a delay time obtained by subtracting the common delay time from an RTT according to a distance 612 between the satellite 620 and the terminal 610-2 located at various points. That is, the RTT of the terminal 610-1 and the RTT of the terminal 610-2 may have a difference as much as the differential delay time. In this case, timings at which a signal transmitted from the terminal 610-1 and a signal transmitted from the terminal 610-2 arrive at the satellite 620, respectively, may have a difference by the differential delay time.

Figure 7:
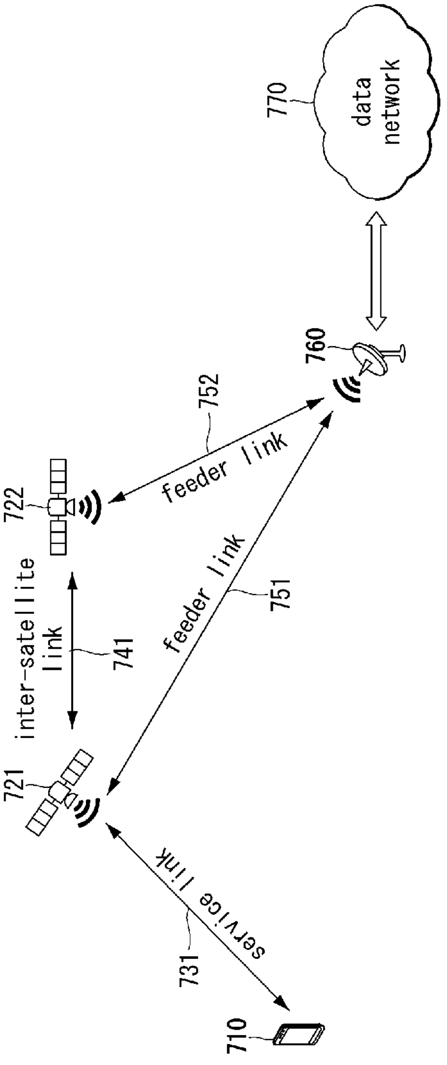
FIG. 7 is a conceptual diagram for describing various common delays existing in a non-terrestrial network environment.

FIG. 7 is a conceptual diagram for describing various common delays existing in a non-terrestrial network environment.

Referring to FIG. 7, at least three types of radio links may exist in the NTN environment. At least three types of radio links may include a service link 731 between a terminal 710 and a satellite 721, an inter-satellite link 741, and a feeder link 751 or 752 between the satellite 721 or 722 and a base station 760 connected to a data network 770. In this case, there may be a common delay time of the service link, a common delay time of the inter-satellite link, and a common delay time of the feeder link.

Meanwhile, the delay time parameters may include a first RTT parameter (i.e., CD_SL) representing an RTT between the terminal and the satellite and a second RTT parameter (i.e., CD_FL) representing an RTT between the satellite and the base station. Alternatively, the delay time parameters may include a third RTT parameter (i.e., CD_TL) obtained by adding an RTT margin to a value obtained by summing the second RTT parameter and the first RTT parameter. That is, the third RTT parameter may be (CD_SL+CD_FL+ RTT margin). Alternatively, the delay time parameters may further include a fourth RTT parameter (i.e., CD_SL+CD_FL) obtained by summing the first RTT parameter and the second RTT time parameter.

In this case, the delay time parameters may further include a switching delay time parameter indicating a delay time according to a switching of a carrier or bandwidth part (BWP) during uplink or downlink communication in the satellite. Alternatively, the second RTT time parameter between the satellite and the base station may reflect a delay time caused by switching a carrier or BWP during downlink communication. Accordingly, the second RTT time parameter may include a delay time according to a switching of a carrier or BWP during downlink communication. The first to third RTT parameters, which are the delay time parameters, may be cell-specific, beam-specific, or bandwidth part-specific (i.e., BWP-specific).

When the delay time parameters are cell-specific parameters, each of them may be set to one value per cell. Alternatively, when the delay time parameters are cell-specific parameters, they may be set to fixed values. Alternatively, when the delay time parameters are cell-specific parameters, each of them may be set to a value that varies according to time. Alternatively, when the delay time parameters are cell-specific parameters, each of them may be set to multiple values. In addition, when the delay time parameters are beam-specific parameters, each of them may be set to one value per beam. Alternatively, when the delay time parameters are beam-specific parameters, they may be set to fixed values. Alternatively, when the delay time parameters are beam-specific parameters, each of them may be set to a value that varies according to time. Alternatively, when the delay time parameters are beam-specific parameters, each of them may be set to multiple values. In addition, when the delay time parameters are BWP-specific parameters, each of them may be set to one value per BWP. Alternatively, when the delay time parameters are BWP-specific parameters, they may be set to fixed values. Alternatively, when the delay time parameters are BWP-specific parameters, each of them may be set to a value that varies according to time. Alternatively, when the delay time parameters are BWP-specific parameters, each of them may be set to multiple values.

Meanwhile, the base station may set the first to third RTT parameters to the terminal through radio resource control (RRC), medium access control (MAC) control element (CE), or downlink control information (DCI) signaling. Alternatively, the base station may change the first to third RTT parameters set in the terminal through RRC, MAC CE, or DCI signaling.

In addition, the base station may set timing parameters to the terminal for timing management of the terminal. These timing parameters may include a timing management parameter (i.e., Kof) and a timing margin parameter (i.e., Bt). The timing parameters may be cell-specific, beam-specific or BWP-specific. Each of the timing parameters may be configured as one value. Alternatively, each of the timing parameters may be configured as multiple values. Meanwhile, the base station may set the timing parameters to the terminal through RRC, MAC CE, or DCI signaling.

Alternatively, the base station may change the timing parameters set in the terminal through RRC, MAC CE or DCI signaling.

Here, the timing management parameter may be configured as one value. Alternatively, the timing management parameter may be configured as multiple values. In addition, the timing management parameter may be configured to have the same value as one of the delay time parameters. Alternatively, the timing management parameter may be configured as a value different from the delay time parameters. For example, when the first RTT parameter is the minimum RTT between the terminal and the satellite within a cell or beam coverage, the timing management parameter may be the maximum RTT between the terminal and the satellite within the cell or beam coverage. Such the timing management parameter may be mainly set for managing a transmission timing of the terminal. For example, the timing management parameter may be configured as Pc1, Pc2, Pc3, Pc4, Pc5, . . . , and Pcn. Here, n may be a natural number. In addition Pc1, Pc2, Pc3, Pc4, Pc5, . . . , and Pcn may be, for example, one of {0, CD_SL, CD_FL, CD_SL+CD_FL, CD_TL}. In this case, CD_SL and CD_FL may be replaced with ED_SL and ED_FL, respectively.

Meanwhile, the timing margin parameter may be a parameter set in units of slots, symbols, or time units. The base station may inform the timing margin parameter to the terminal. The terminal may receive the timing margin parameter from the base station, and store the timing margin parameter. Alternatively, the timing margin parameter may be a value preset in the terminal by a communication service provider. Such the timing margin parameter may be a single value. Alternatively, the timing margin parameter may have multiple values. For example, the timing margin parameter may configured as Bt1, Bt2, Bt3, Bt4, Bt5, . . . , and Btn. Here, Bt1, Bt2, Bt3, Bt4, Bt5, . . . , and Btn may be set as a positive number of symbols. For example, it may be 4 slots or less. Here, n may be a natural number.

The base station may transmit position parameters indicating coordinates to the terminal in addition to the first to third RTT parameters corresponding to the RTTs. The terminal may receive the position parameters from the base station, and store them. Such the position parameters may include a first position parameter indicating a position of the satellite by a coordinate (i.e., AX_SL) or an index (i.e., AX_ID_SL). In addition, the position parameters may include a second position parameter indicating a position of the base station by a coordinate (i.e., AX_FL) or an index (i.e., AX_ID_FL). In this manner, both the positions of the satellite and the base station may be represented by coordinates. In addition, the position of the satellite may be determined using an ephemeris. The first position parameter indicating the position of the satellite may include main parameters of orbital dynamics of all commercial satellites.

Here, the ephemeris may be used by astronomers to describe the positions and orbital motions of stars and other celestial bodies. For example, the ephemeris for each object may be expressed in an American standard code for information interchange (ASCII) file using a two-line element (TLE) data format. The TLE data format may encode a list of orbital elements of an Earth orbiting object such as a satellite into two lines each having 70 columns. Since the satellite ephemeris includes information such as the position and speed of the satellite, the base station may inform direct coordinates (i.e., AX_SL, AX_FL) of the satellite to the terminal, or inform the corresponding indexes (i.e., AX_ID_SL, AX_ID_FL) to the terminal. When the base station transmits the indexes (i.e., AX_ID_SL, AX_ID_FL) to the terminal, the terminal may receive the indexes from the base station. In addition, the terminal may obtain coordinates of the satellite and the base station by mapping the ephemeris stored in the memory and the corresponding indexes. In this case, the indexes (i.e., AX_ID_SL or AX_ID_FL) may be set according to the satellite and the base station. In addition, the index may be configured as an integrated index (i.e., AX_ID) composed of an index (i.e., AX_ID_SL) indicating the coordinate of the satellite and an index (i.e., AX_ID_FL) indicating the coordinate of the base station.

In addition, the terminal may obtain the coordinate of the base station and the coordinate of the satellite from the base station. The terminal may estimate a coordinate indicating its position by using a global navigation satellite system (GNSS). Accordingly, the terminal may calculate the RTT between the satellite and the terminal by using the coordinate of the terminal and the coordinate of the base station. Also, the terminal may calculate the RTT between the satellite and the base station by using the coordinate of the satellite and the coordinate of the base station. When the indexes are configured respectively according to the satellite and the base station, the terminal may obtain the coordinate of the base station through changing the coordinate index (i.e., AX_ID_FL) of the base station during switching of the feeder link.

Meanwhile, the base station may transmit time stamps to the terminal in addition to the coordinates. The terminal may receive the time stamps from the base station, and store them. The base station may transmit, to the terminal, a first time stamp parameter (i.e., TSM_FL) indicating a timing of transmitting a specific signal (e.g., MIB, SIB, synchronization signal block (SSB), or channel state information reference signal (CSI-RS)) to the satellite via the satellite. In addition, the base station may transmit, to the terminal, a second time stamp parameter (i.e., TSM_SL) indicating a timing of transmitting a specific signal to the terminal via the satellite. The terminal may receive the first time stamp parameter and the second time stamp parameter from the base station. The terminal may calculate a reception timing at which a signal transmitted from the satellite or the base station is received by using a GNSS. The terminal may estimate the RTT between the satellite and the terminal and the RTT between the satellite and the base station based on a difference between the reception timing and the first time stamp parameter or the second time stamp parameter.

As described above, the base station may set the delay parameters corresponding to the common delay, the position parameters corresponding to the coordinates, the time stamp parameters corresponding to the time stamps, and the timing parameters for timing management according to a situation. Alternatively, the base station may set a portion of the delay parameters corresponding to the common delay, the position parameters corresponding to the coordinates, the time stamp parameters corresponding to the time stamps, and the timing parameters for timing management according to a situation. Alternatively, the base station may not set the delay parameters corresponding to the common delay, the position parameters corresponding to the coordinates, the time stamp parameters corresponding to the time stamps, and the timing parameters for timing management according to a situation. The base station may transmit the set parameters to the terminal when the corresponding parameters are set. Accordingly, the terminal may receive the parameters from the base station, and may use them for timing management. Here, the RTT between the satellite and the terminal calculated (or estimated) by the terminal may be expressed as a 'first estimated RTT parameter (i.e., ED_SL)'. Here, it may be assumed that ED_SL and CD_SL are the same. In addition, the RTT between the base station and the satellite calculated (or estimated) by the terminal may be expressed as a 'second estimated RTT time parameter (i.e., ED_FL)'. Here, it may be assumed that ED_FL and CD_FL are the same. The terminal may utilize the parameters according to various situations. Additionally, the delay parameters may further include the first estimated RTT parameter and the second estimated RTT parameter.

Meanwhile, in the communication system, a random access procedure may be performed for synchronization acquisition, power control, uplink resource request, and/or handover. The random access (RA) resources may include a physical random access channel (PRACH) transmission occasion (RAO) used for transmission and reception of a random access preamble and a random access preamble index (RAPIdx) for identifying a random access preamble. The random access preamble may be configured as a sequence having autocorrelation characteristics. A random access procedure between the base station and the terminal may be identified by the random access resources (e.g., RAO and RAPIdx). The RAO may be time-frequency resources for transmission and reception of a random access preamble. The length of the RAO in the time domain may vary according to a subcarrier spacing, a preamble format, and the like. For example, the length of the RAO in the time domain may be the length of one or more symbols, one or more slots, or a subframe(s). In the frequency domain, the RAO may be configured with one or more subcarriers within a system bandwidth (e.g., bandwidth part (BWP)).

Figure 8:
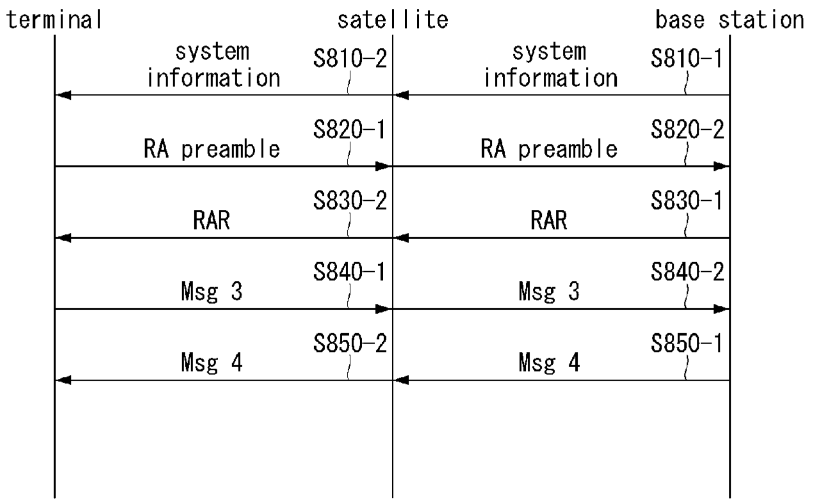
FIG. 8 is a sequence chart illustrating a first exemplary embodiment of a random access procedure.

FIG. 8 is a sequence chart illustrating a first exemplary embodiment of a random access procedure.

Referring to FIG. 8, the base station may transmit a synchronization signal (e.g., synchronization signal/physical broadcast channel (SS/PBCH) block) to the satellite. The satellite may receive the synchronization signal from the base station, and may transmit the received synchronization signal to the terminal. The terminal may receive the synchronization signal from the satellite, and may acquire synchronization (e.g., downlink timing) of a downlink frame based on the synchronization signal. Here, the synchronization signal (e.g., SS/PBCH block) may include a primary synchronization signal (PSS) and a second synchronization signal (SSS). In addition, the base station may transmit system information including PRACH configuration information, the delay parameters, the position parameters, the time stamp parameters, and/or the timing parameters to the satellite (S810-1). Accordingly, the satellite may receive the system information from the base station, and transmit the received system information to the terminal (S810-2). The terminal may receive the system information from the satellite, and may obtain the PRACH configuration information from the received system information (e.g., SIB). Also, the terminal may obtain the delay parameters, the position parameters, the time stamp parameters, and/or the timing parameters from the received system information. Here, a case where the satellite and the base station exist separately may be described as an example. However, even when the satellite includes the base station, the above-described procedure may be applicable as being modified.

The PRACH configuration information may include information indicating time frequency resources of a PRACH, parameters required for generating an RA preamble (e.g., configuration information of preamble sets #0 and #1), and the like. Alternatively, the PRACH configuration information may be transmitted from the base station to the terminal through another message (e.g., RRC message) instead of the system information. When the terminal obtains the PRACH configuration information, the terminal may start a random access procedure. Here, the delay parameters may include at least one or more of the first to fourth RTT parameters. In addition, the position parameters may include at least one of the first position parameter and the second position parameter. In addition, the time stamp parameters may include at least one of the first time stamp parameter and the second time stamp parameter. The timing parameters may include at least one of the timing management parameter and the timing margin parameter. Meanwhile, the random access procedure may be initialized by the base station. The terminal may randomly select one RA preamble sequence from the preamble set #0 or #1. The preamble set used by the terminal may be indicated by the base station via the satellite. The terminal may generate an RA preamble using the selected RA preamble sequence, and may transmit the generated RA preamble to the satellite (S820-1). The terminal may transmit the RA preamble on a PRACH (e.g., RAO) configured by the base station. The RA preamble may be referred to as an 'RA Msg1'. As described above, when the terminal transmits the PRACH (i.e., Msg1) for initial access, it may be transmitted at a first transmission timing earlier by a first timing adjustment value (i.e., Pc1−Bt1) than a timing corresponding to the RAO mapped with an SSB. A first timing margin parameter (i.e., Bt1) constituting the first timing adjustment value may be a parameter set in units of slots, symbols, or time units.

Here, a first timing management parameter (i.e., Pc1) constituting the first timing adjustment value may be set to one of {0, CD_SL, CD_FL, CD_SL+CD_FL, CD_TL}. In this case, CD_SL and CD_FL may be replaced with ED_SL and ED_FL, respectively. For example, when the terminal is able to estimate the RTT between the satellite and the terminal by using a GNSS, the first timing management parameter may be ED_SL. Alternatively, when the terminal is not able to estimate the RTT between the satellite and the terminal by using a GNSS, the first timing management parameter may be CD_SL.

On the other hand, the satellite may receive the RA preamble from the terminal and transmit the received RA preamble to the base station (S820-2). The base station may receive the RA preamble from the satellite by performing a monitoring operation on a PRACH (e.g., RAO). The base station may generate a random access response (RAR) based on the received RA preamble, and may transmit the generated RAR to the satellite (S830-1). The RAR may be referred to as an 'RA Msg 2'. The satellite may receive the RAR from the base station and may transmit the received RAR to the terminal (S830-2). The terminal may receive the RAR from the satellite. In this case, the terminal may start monitoring for receiving the RAR after a random access offset time (i.e., RA_of) elapses after transmitting the PRACH, and perform the monitoring during a random access response window time (i.e., RA-response window) received from the base station.

Here, the random access offset time (i.e., RA_of) may be a second timing adjustment value (i.e., Pc2−Bt2). Here, a second timing management parameter (i.e., Pc2) may be set to one of {0, CD_SL, CD_FL, CD_SL+CD_FL, CD_TL}. In this case, CD_SL and CD_FL may be replaced with ED_SL and ED_FL, respectively. For example, when the terminal is able to estimate the RTT between the satellite and the terminal by using a GNSS, Pc2 may be (ED_SL+CD_FL). When the terminal is not able to estimate the RTT between the satellite and the terminal by using a GNSS, Pc2 may be (CD_SL+CD_FL). Then, a second timing margin parameter (i.e., Bt2) constituting the second timing adjustment value may be a parameter set in units of slots, symbols, or time units. The base station may inform the second timing adjustment value to the terminal through an MIB or SIB. Alternatively, the second timing adjustment value may be preset in the terminal by a communication service provider as one value among the various parameters described above. The base station may change the second timing adjustment value set in the terminal through RRC, MAC CE, or DCI signaling. When a cell or beam is switched (i.e., differently from the beam failure recovery described below), the parameters described above may follow related parameters of a switched cell or beam.

Meanwhile, the terminal may transmit a Msg 3 to the satellite after receiving the RAR (S840-1). In this case, according to the conventional scheme, the terminal may receive the RAR and may transmit the Msg 3 after a response delay time corresponding to (K2+δ) (or, K1+δ) elapses. Here, K1 or K2 may refer to the number of slots, K1 may be one of 0, 1, 2, 3, . . . , and 15, and K2 may be one of 0, 1, 2, 3, . . . , and 7. δ may be an arbitrary small positive value. Here, the terminal may transmit the Msg 3 at a third transmission timing obtained by adding a third timing adjustment value (i.e., Pc3−Bt3) to the response delay time corresponding to (K2+δ) (or, K1+δ). Here, a third timing management parameter (i.e., Pc3) constituting the third timing adjustment value may be set to one of {0, CD_SL, CD_FL, CD_SL+CD_FL, CD_TL} or set to an arbitrary value broadcast by the base station. In this case, CD_SL and CD_FL may be replaced with ED_SL and ED_FL, respectively. Here, the arbitrary value may be a first maximum RTT parameter (i.e., CD_SL_max) between the terminal and the satellite. Alternatively, the arbitrary value may be a second maximum RTT time parameter (i.e., CD_TL_max) between the base station and the terminal. Accordingly, Pc3 may be CD_SL_max or CD_TL_max. The first maximum RTT parameter and the second maximum RTT parameter may be included in the delay time parameters of the system information transmitted by the base station to the terminal in the steps S810-1 and S810-2. Then, a third timing margin parameter (i.e., Bt3) may be a parameter set in units of slots, symbol, or time units. The third timing margin parameter may be transmitted by the base station to the terminal or may be a value (e.g., a positive number of symbols) set in the terminal. Alternatively, the third timing margin parameter may be 0. The third timing adjustment value may be CD_SL_max or CD_TL_max.

The base station may inform the first maximum RTT parameter corresponding to CD_SL_max to the terminal via the satellite. In this case, when the terminal is able to estimate the RTT between the satellite and the terminal by using a GNSS, the terminal may estimate ED_SL. If the estimated ED_SL is greater than the third timing adjustment value or CD_SL_max, the terminal may not access the cell or beam, and may attempt to access another cell or another beam. In this case, CD_SL_max may be a cell-specific or beam-specific parameter. The above-described scheme of accessing another cell or beam without accessing the corresponding cell or beam when the estimated ED_SL is greater than the third timing adjustment value or CD_SL-_max may also be applied to the beam switching, beam failure recovery, or handover procedure. In this case, the terminal may include ED_SL in the Msg 3 and transmit it to the base station via the satellite. The base station may receive ED_SL transmitted from the terminal via the satellite. An updated timing management parameter (i.e., Kof_up) may be used instead of the timing management parameter (i.e., Kof) for managing the transmission timing of the terminal after the base station obtains ED_SL of the terminal.

Meanwhile, the satellite may receive the Msg 3 from the terminal and may transmit the received the Msg 3 to the base station (S840-2). Accordingly, the base station may receive the Msg 3 from the satellite. The base station may transmit a Msg 4 to the satellite in response to the Msg 3 (S850-1). The satellite may receive the Msg 4 from the base station and transmit the received Msg 4 to the terminal (S850-2). The Msg 4 may include an identifier included in the Msg 3. The terminal may receive the Msg 4 from the satellite. The terminal may determine that a contention has been resolved when the Msg 4 is received from the base station via the satellite.

In this manner, when the terminal receives the Msg 4, it may be required to set an offset (i.e., Msg 4 monitoring offset time) of a monitoring time for receiving the Msg 4. After transmitting the Msg 3, the terminal may start monitoring for receiving the Msg 4 after the Msg 4 monitoring offset time (i.e., M4_*of*) elapses. Here, the Msg 4 monitoring offset time (i.e., M4_*of*) may be a fourth timing adjustment value (i.e., Pc4−Bt4), and a fourth timing management parameter (i.e., Pc4) may be set to one of {0, CD_SL, CD_FL, CD_SL+CD_FL, CD_TL}. Here, CD_SL may be replaced with ED_SL. Alternatively, CD_SL may be the most recent RTT parameter (i.e., TA_UE_SL) between the terminal and the satellite, which is recognized by the terminal until transmission of a PRACH for beam failure recovery of the terminal according to the timing adjustment procedure of the base station and the terminal. Accordingly, the fourth timing management parameter may be, for example, TA_UE_SL. In addition, CD_FL may be replaced with ED_FL. Alternatively, CD_FL may be the most recent RTT parameter (i.e., TA_UE_FL) between the satellite and the base station, which is recognized by the terminal until transmission of a PRACH for beam failure recovery of the terminal according to the timing adjustment procedure of the base station and the terminal. Accordingly, the fourth timing management parameter may be, for example, TA_UE_FL. A fourth timing margin parameter (i.e., Bt4) may be a parameter set in units of slots, symbols, or time units. The fourth timing margin parameter may be transmitted by the base station to the terminal via the satellite, or may be a value (e.g., a positive number of symbols) set in the terminal. Alternatively, the fourth timing margin parameter may be 0.

Meanwhile, the base station may transmit the fourth timing adjustment value to the terminal via the satellite through the MIB, SIB, or RAR. Alternatively, the base station may transmit the fourth timing adjustment value to the terminal via the satellite as the same value as the second timing adjustment value. Accordingly, the terminal may receive the fourth timing adjustment value from the base station via the satellite, and use the fourth timing adjustment value. Alternatively, the fourth timing adjustment value may be preset in the terminal by a communication service provider as one of the various parameter values described above. The base station may change the fourth timing adjustment value of the terminal through RRC, MAC-CE, or DCI signaling. When a cell or beam is switched (i.e., different from beam failure recovery described below), the parameters described above may follow related parameters of the switched cell or beam.

Figure 9:
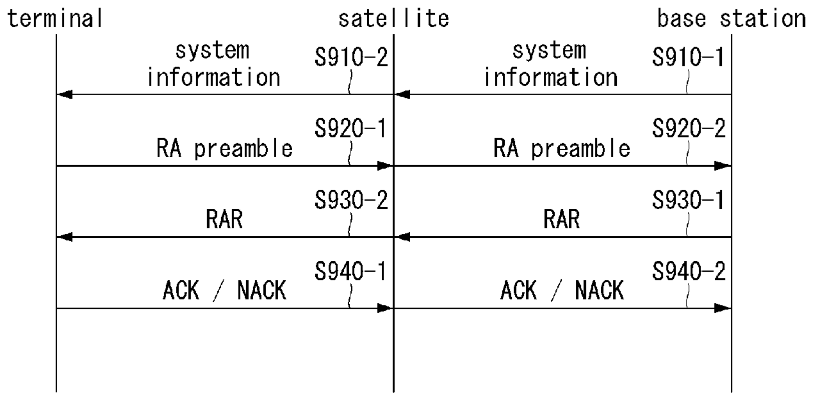
FIG. 9 is a sequence chart illustrating a second exemplary embodiment of a random access procedure.

FIG. 9 is a sequence chart illustrating a second exemplary embodiment of a random access procedure.

Referring to FIG. 9, the base station may transmit a synchronization signal (e.g., SS/PBCH block) to the satellite. The satellite may receive the synchronization signal from the base station, and may transmit the received synchronization signal to the terminal. The terminal may receive the synchronization signal from the satellite, and may acquire synchronization (e.g., downlink timing) of a downlink frame based on the synchronization signal. Here, the synchronization signal (e.g., SS/PBCH block) may include a PSS and an SSS. In addition, the base station may transmit system information including the PRACH configuration information, the delay parameters, the position parameters, the time stamp parameters, and/or the timing parameters to the satellite (S910-1). Accordingly, the satellite may receive the system information from the base station, and transmit the received system information to the terminal (S910-2). The terminal may receive the system information from the satellite, and may obtain the PRACH configuration information from the received system information (e.g., SIB). Also, the terminal may obtain the delay parameters, the position parameters, the time stamp parameters, and/or the timing parameters from the received system information. Here, a case where the satellite and the base station exist separately may be described as an example. However, even when the satellite includes the base station, the above-described procedure may be applicable as being modified.

The PRACH configuration information may include information indicating time frequency resources of a PRACH, parameters required for generating an RA preamble (e.g., configuration information of preamble sets #0 and #1), and the like. Alternatively, the PRACH configuration information may be transmitted from the base station to the terminal through another message (e.g., RRC message) instead of the system information via the satellite. When the terminal obtains the PRACH configuration information, the terminal may start a random access procedure. Here, the delay parameters may include at least one or more of the first to fourth RTT parameters. In addition, the position parameters may include at least one of the first position parameter and the second position parameter. In addition, the time stamp parameters may include at least one of the first time stamp parameter and the second time stamp parameter. The timing parameters may include at least one of the timing management parameter and the timing margin parameter. Meanwhile, the random access procedure may be initialized by the base station. The terminal may randomly select one RA preamble sequence from the preamble set #0 or #1. The preamble set used by the terminal may be indicated by the base station via the satellite. The terminal may generate an RA preamble using the selected RA preamble sequence, and may transmit the generated RA preamble to the satellite (S920-1). The terminal may transmit the RA preamble on a PRACH (e.g., RAO) configured by the base station. The RA preamble may be referred to as an 'RA MsgA'. As described above, when the terminal transmits the PRACH (i.e., Msg A) for initial access, it may be transmitted at a first transmission timing earlier by a first timing adjustment value (i.e., Pc1−Bt1) than a timing corresponding to the RAO mapped with a SSB.

Here, the first timing management parameter (i.e., Pc1) constituting the first timing adjustment value may be set to one of {0, CD_SL, CD_FL, CD_SL+CD_FL, CD_TL}. In this case, CD_SL and CD_FL may be replaced with ED_SL and ED_FL, respectively. For example, when the terminal is able to estimate the RTT between the satellite and the terminal by using a GNSS, the first timing management parameter may be ED_SL. Alternatively, when the terminal is not able to estimate the RTT between the satellite and the terminal by using a GNSS, the first timing management parameter may be CD_SL. The first timing margin parameter (i.e., Bt1) constituting the first timing adjustment value may be a parameter set in units of slots, symbols, or time units. The first timing margin parameter may be informed by the base station to the terminal via the satellite, or may be a value (e.g., a positive number of symbols) set in the terminal. Alternatively, the first timing margin parameter may be 0.

On the other hand, the satellite may receive the RA preamble from the terminal and transmit the received RA preamble to the base station (S920-2). The base station may receive the RA preamble from the satellite by performing a monitoring operation on a PRACH (e.g., RAO). The base station may generate an RAR based on the received RA preamble, and may transmit the generated RAR to the satellite (S930-1). The RAR may be referred to as an 'RA Msg B'. The satellite may receive the RAR from the base station and may transmit the received RAR to the terminal (S930-2). The terminal may receive the RAR from the satellite. In this case, the terminal may start monitoring for receiving the RAR after a random access offset time (i.e., RA_of) elapses after transmitting the PRACH, and perform the monitoring during a random access response window time (i.e., RA-response window) received from the base station via the satellite.

Here, the random access offset time (i.e., RA_of) may be a second timing adjustment value (i.e., Pc2−Bt2). Here, the second timing management parameter (i.e., Pc2) may be set to one of {0, CD_SL, CD_FL, CD_SL+CD_FL, CD_TL}. In this case, CD_SL and CD_FL may be replaced with ED_SL and ED_FL, respectively. For example, when the terminal is able to estimate the RTT between the satellite and the terminal by using a GNSS, Pc2 may be (ED_SL+CD_FL). When the terminal is not able to estimate the RTT between the satellite and the terminal by using a GNSS, the second timing management parameter may be (CD_SL+CD_FL). Then, the second timing margin parameter (i.e., Bt2) constituting the second timing adjustment value may be a parameter set in units of slots, symbols, or time units. The base station may transmit the second timing adjustment value to the terminal through an MIB or SIB. Alternatively, the second timing adjustment value may be preset in the terminal by a communication service provider as one value among the various parameters described above. The base station may change the second timing adjustment value set in the terminal through RRC, MAC CE, or DCI signaling. When a cell or beam is switched (i.e., differently from the beam failure recovery described below), the parameters described above may follow related parameters of a switched cell or beam.

Meanwhile, the terminal may transmit an acknowledgment (ACK) or non-acknowledgment (NACK) to the satellite after receiving the RAR (S940-1). Then, the satellite may receive the ACK or NACK response from the terminal, and transmit the received ACK or NACK response to the base station (S940-2). In this case, according to the conventional scheme, the terminal may receive the RAR and may transmit the ACK or NACK response after a response delay time corresponding to (K2+δ) (or, K1+δ) elapses. Here, K1 or K2 may refer to the number of slots, K1 may be one of 0, 1, 2, 3, . . . , 15, and K2 may be one of 0, 1, 2, 3, . . . , and 7. δ may be an arbitrary small positive value. Here, the terminal may transmit the ACK or NACK response at a third transmission timing obtained by adding a third timing adjustment value (i.e., Pc3−Bt3) to the response delay time (K2+δ) (or K1+δ). Here, the third timing management parameter (i.e., Pc3) of the third timing adjustment value may be set to one of {0, CD_SL, CD_FL, CD_SL+CD_FL, CD_TL} or an arbitrary value broadcast by the base station. In this case, CD_SL and CD_FL may be replaced with ED_SL and ED_FL, respectively. Here, the arbitrary value may be a first maximum RTT parameter (i.e., CD_SL_max) between the terminal and the satellite. Alternatively, the arbitrary value may be a second maximum RTT parameter (i.e., CD_TL_max) between the base station and the terminal. Accordingly, Pc3 may be CD_SL_max or CD_TL_max. On the other hand, the third timing margin parameter (i.e., Bt3) may be a parameter set in units of slots, symbol, or time units. The third timing margin parameter may be informed by the base station to the terminal via the satellite or a value (e.g., set as a positive number of symbols) set in the terminal. Alternatively, the third timing margin parameter may be 0. The third timing adjustment value may be CD_SL_max or CD_TL_max.

The base station may inform the first maximum RTT parameter corresponding to CD_SL_max to the terminal via the satellite. In this case, when the terminal is able to estimate the RTT between the satellite and the terminal by using a GNSS, the terminal may estimate ED_SL. If the estimated ED_SL is greater than the third timing adjustment value or CD_SL_max, the terminal may not access the cell or beam, and may attempt to access another cell or another beam. In this case, CD_SL_max may be a cell-specific or beam-specific parameter. The above-described scheme of accessing another cell or beam without accessing the corresponding cell or beam when the estimated ED_SL is greater than the third timing adjustment value or CD_SL-_max may also be applied to the beam switching, beam failure recovery, or handover procedure. In this case, the terminal may include ED_SL in the Msg 3 and transmit it to the base station via the satellite. The base station may receive ED_SL transmitted from the terminal via the satellite. An updated timing management parameter (i.e., Kof_up) may be used instead of the timing management parameter (i.e., Kof) for managing the transmission timing of the terminal after the base station obtains ED_SL of the terminal. Accordingly, the base station may receive the ACK or NACK response from the terminal via the satellite.

Meanwhile, the terminal may proceed with a beam failure procedure when a beam failure is detected during communication with the base station.

Figure 10:
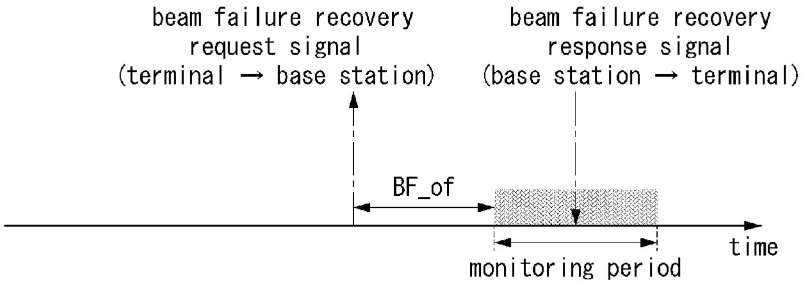
FIG. 10 is a conceptual diagram illustrating a first exemplary embodiment of a beam failure recovery procedure.

FIG. 10 is a conceptual diagram illustrating a first exemplary embodiment of a beam failure recovery procedure.

Referring to FIG. 10, the terminal may transmit, for beam failure recovery, a beam failure recovery request signal to the base station via the satellite on a PRACH. In addition, the terminal may perform a monitoring operation in a preconfigured monitoring period to receive a beam failure recovery response signal, which is a response to the beam failure recovery request signal, from the base station via the satellite. An interval between the timing of transmitting the beam failure recovery request signal and a timing of starting the preconfigured monitoring period may be four slots. The base station may receive the beam failure recovery request signal from the terminal via the satellite, and transmit the beam failure recovery response signal to the terminal via the satellite in the preconfigured period. As described above, after four slots from the timing at which the terminal transmits the beam failure recovery request signal on the PRACH, the terminal may monitor the beam failure recovery response signal (e.g., a PDCCH in a search space set provided by a recovery search space identifier (ID)) of the base station. In this case, it may be required to set a beam failure recovery offset (i.e., BF_of) for starting the monitoring of the terminal on the beam failure recovery response signal. After transmitting the PRACH for the beam recovery procedure, the terminal may start monitoring for receiving the beam failure response signal after the beam failure recovery offset (i.e., BF_of) elapses, which is the monitoring offset time of the beam failure response signal. Here, a case where the satellite and the base station exist separately may be described as an example. However, even when the satellite includes the base station, the above-described procedure may be applicable as being modified.

In this case, the terminal may monitor the beam failure recovery response signal in the monitoring period configured according to a beam failure recovery configuration received from the base station. The beam failure recovery offset (i.e., BF_of), which is the monitoring offset time of the beam failure response signal, may be a fifth timing adjustment value (i.e., Pc5−Bt5). Here, a fifth timing management parameter (i.e., Pc5) may be set to one of {0, CD_SL, CD_FL, CD_SL+CD_FL, CD_TL} or a value obtained by adding four slots thereto. Here, CD_SL may be replaced with ED_SL or TA_UE_SL. Also, CD_FL may be replaced with ED_FL or TA_UE_FL. Also, the fifth timing management parameter may be TA_UE_SL+CD_FL. Here, a fifth timing margin parameter (i.e., Bt5) may be a parameter set in units of slots, symbols, or time units. The fifth timing margin parameter may be informed by the base station to the terminal via the satellite or a value (e.g., a positive number of symbols) set in the terminal. Alternatively, the fifth timing margin parameter may be 0. TA_UE_SL and TA_UE_FL may be the most recent RTT between the terminal and the satellite and the most recent RTT between the base station and the satellite, which are recognized by the terminal until transmission of the PRACH for beam failure recovery of the terminal according to the timing adjustment procedure of the base station and the terminal, respectively.

Meanwhile, the base station may transmit the fifth timing adjustment value to the terminal via the satellite through the MIB, SIB, or RAR. Alternatively, the base station may transmit the fifth timing adjustment value to the terminal via the satellite as the same value as the second timing adjustment value. Accordingly, the terminal may receive the fifth timing adjustment value from the base station via the satellite, and use the fifth timing adjustment value. Alternatively, the fifth timing adjustment value may be preset in the terminal by a communication service provider as one of the various parameter values described above. The base station may change the fifth timing adjustment value of the terminal through RRC, MAC-CE, or DCI signaling. When a cell or beam is switched (i.e., different from beam failure recovery described below), the parameters described above may follow related parameters of a switched cell or beam.

The parameters for {Pc1 to Pc3, Bt1 to Bt3} described above may be equally applied to timing management for PRACH transmission of the terminal in the RRC idle or inactive state, and the PDCCH monitoring procedure of the terminal according to the response of the base station. In addition, the parameters for {Pc4 to Pc5, Bt4 to Bt5} may be equally applied to timing management for PRACH transmission of the terminal in the RRC connected state, and the PDCCH monitoring procedure of the terminal according to the response of the base station. In addition, in case of the timing management parameter (i.e., Kof), similarly to the above-described scheme for the Msg 3, the terminal in the RRC connected mode may apply the updated timing management parameter (i.e., Kof_up) described below to an interval between a timing of DCI by which the base station requests transmission from the terminal and a timing at which the terminal transmits data according to the DCI, in addition to the conventional value (e.g., K1 or K2+other value (defined in the specification)).

When the feeder link is changed (i.e., when the feeder link is switched) and the RTT between the satellite and the base station is changed, the base station may update the CD_FL, CD_TL, or the parameter related to the coordinate of the base station or the parameter related to the time stamp of the base station. The base station may transmit the corresponding values to the terminal through SIB, RRC or MAC-CE signaling.

2. Reference for Transmission of a RACH Preamble of Terminal

When the terminal transmits a PRACH preamble in the RRC idle state, the terminal may use the RTT of the link (one of the satellite-to-device link, the relay-to-device link, and the base station-to-device link), which is estimated using a GNSS, to a timing of transmitting the PRACH preamble.

Figure 11:
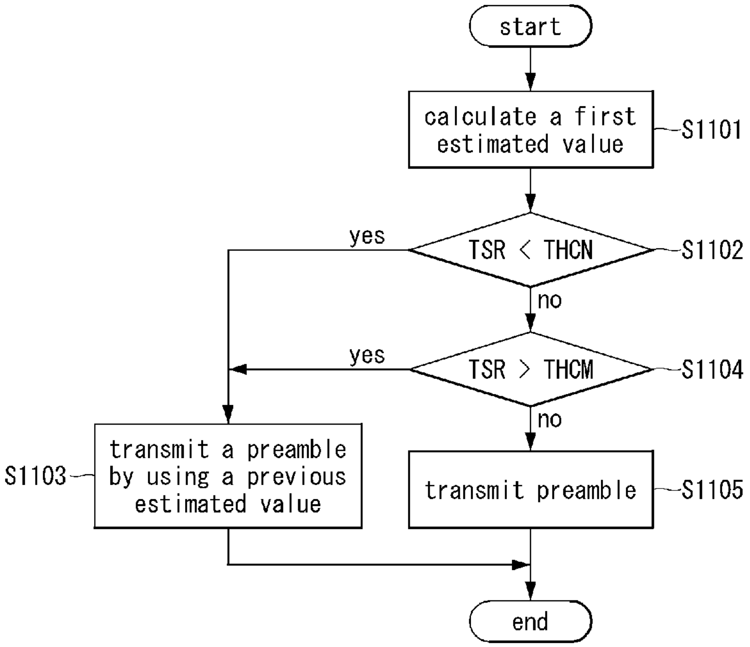
FIG. 11 is a flowchart illustrating a first exemplary embodiment of a PRACH preamble transmission method of a terminal.

FIG. 11 is a flowchart illustrating a first exemplary embodiment of a PRACH preamble transmission method of a terminal.

Referring to FIG. 11, in a PRACH preamble transmission method of the terminal, the terminal may estimate the RTT of the link (one of the satellite-to-terminal link, the relay-to-terminal link, or the base station-to-terminal link) by using a GNSS to calculate a first estimated value (i.e., TSR) (S1101). Here, the first estimated value may be a value obtained by adding a transmission margin to a value obtained by summing the first estimated RTT parameter and the second RTT parameter. Here, when the value obtained by summing the first estimated RTT parameter and the second RTT parameter is referred to as a third RTT parameter (i.e., ED_TL), the first estimated value may be (ED_TL+transmission margin). That is, the first estimated value may be (ED_SL+CD_FL+transmission margin). The transmission margin may be a parameter set in units of slots, symbols, or time units. The base station may inform the transmission margin to the terminal via the satellite, or it may be a value (e.g., a positive number of symbols) set in the terminal. Alternatively, the transmission margin may be 0. Here, the transmission margin may correspond to four slots or less in units of symbols. Alternatively, the first estimated value may be a value obtained by adding the transmission margin to a value obtained by summing the second estimated RTT parameter to the first RTT parameter. Alternatively, the first estimated value may be a value obtained by adding the transmission margin to a value obtained by summing the second estimated RTT parameter and the first estimated RTT parameter. Here, a case where the satellite and the base station exist separately may be described as an example. However, even when the satellite includes the base station, the above-described procedure may be applicable as being modified.

Thereafter, the terminal may determine whether the first estimated value estimated for transmitting the PRACH preamble in the RRC idle or inactive state is smaller than a first reference time (i.e., THCN) (S1102). As a result of the determination, if the first estimated value is less than the first reference time, when retransmitting a PRACH preamble, the terminal may transmit a preamble by applying the previous estimated value (S1103). As such, when the terminal applies the previous estimated value, the most recent value among previous estimated values stored in a buffer (or memory) may be applied. In this case, when the terminal applies the previous estimated value, it may be applied to a case within a time window from the present to an arbitrary first reference window time (i.e., THWN). That is, the terminal may not use a previous estimated value that is no longer valid after a certain period of time, and may update the first estimated value by continuously estimating the RTTs. On the other hand, the base station may indicate the first reference window time to the terminal via the satellite. For example, the base station may indicate the first reference window time to the terminal via the satellite through RRC signaling. The first reference window time may be mapped to the existing window parameter (e.g., RA-response window, etc.). The base station may transmit the first reference window time to the terminal via the satellite by configuring a new RRC parameter. The terminal may receive the first reference window time from the base station via the satellite, and may use and store the received first reference window time.

On the other hand, if the first estimated value is less than the first reference time, the terminal may ignore the corresponding value, and may not transmit a preamble when initially transmitting a PRACH preamble. As such, when the estimated value is smaller than the first reference time, the terminal ignores the corresponding value, and the terminal does not transmit the preamble, the terminal may continue to measure signals transmitted by the base station and update the first estimated value until a value equal to or greater than the first reference time is estimated.

The first estimated value may be defined as an estimated RTT or a sum of the estimated RTT and information transmitted by the base station. Here, the information transmitted by the base station may be a cell-specific, beam-specific, or terminal-specific parameter and may be a reference value of the RTT or timing advance that is defined by the base station. For example, the reference value of the RTT or timing advance that is defined by the base station, may be the minimum RTT of the service link, feeder link, or (service link+feeder link) within a cell or beam coverage. Alternatively, the reference value of the RTT or timing advance that is defined by the base station may be a value obtained by adding an arbitrary estimation margin to the minimum RTT of the service link, feeder link, or (service link+feeder link) within the cell or beam coverage.

Meanwhile, the first reference time may be a value determined based on information transmitted by the base station or a preset value. Here, the information transmitted by the base station may be 0, a cell-specific parameter, a beam-specific parameter, or a terminal-specific parameter, and may be a reference value of the RTT or timing advance that is defined by the terminal. For example, the reference value of the RTT or timing advance that is defined by the base station may be the minimum RTT of the service link, feeder link, or (service link+feeder link) within the cell or beam coverage. Alternatively, the reference value of the RTT or timing advance that is defined by the base station may be a value obtained by adding an arbitrary estimation margin to the minimum RTT of the service link, feeder link, or (service link+feeder link) within the cell or beam coverage. As a scheme for mapping the first reference time based on the information transmitted by the base station, the base station may determine the first reference time, and explicitly inform the determined first reference time to the terminal via the satellite. The terminal may receive the first reference time from the base station, and may use and store the received first reference time. Alternatively, the terminal may implicitly determine the first reference time based on the information transmitted by the base station.

Meanwhile, as a result of the determination in the step S1102, if the first estimated value is greater than the first reference time, the terminal may determine whether the first estimated value is greater than a second reference time (i.e., THCM) (S1104). As a result of the determination, if the first estimated value is greater than the second reference time, when retransmitting a preamble, the terminal may transmit a preamble by applying the previous estimated value (S1103).

As described above, when the terminal applies the previous estimated value, the most recent value among previous estimated values stored in the buffer (or memory) may be applied. When the terminal applies the previous estimated value, the previous estimated value may be applied only to a case within a time window from the present to the second reference window time (i.e., THWM). The base station may set the second reference window time to the terminal via the satellite. For example, the base station may indicate the second reference window time to the terminal via the satellite through RRC signaling. The second reference window time may be mapped to the existing window parameter (e.g., RA-response window, etc.). The base station may configure a new RRC parameter including the second reference window time and transmit the new RRC parameter to the terminal via the satellite. The terminal may receive the second reference window time from the base station via the satellite, and may store and use the received second reference window time.

On the other hand, if the first estimated value is greater than the second reference time, the terminal may ignore the corresponding value, and may not transmit a preamble when initially transmitting a PRACH preamble. As such, when the estimated value is smaller than the second reference time, the terminal ignores the corresponding value, and the terminal does not transmit the preamble, the terminal may continue to measure signals transmitted by the base station and update the first estimated value until a value less than the second reference time is estimated.

The second reference time may be determined based on information transmitted by the base station or a preset value. Here, the information transmitted by the base station may be 0, a cell-specific parameter, a beam-specific parameter, or a terminal-specific parameter, and may be a reference value of the RTT or timing advance that is defined by the terminal. For example, the reference value of the RTT or timing advance that is defined by the base station may be the minimum RTT of the service link, feeder link, or (service link+feeder link) within the cell or beam coverage. Alternatively, the reference value of the RTT or timing advance that is defined by the base station may be a value obtained by adding an arbitrary estimation margin to the minimum RTT of the service link, feeder link, or (service link+feeder link) within the cell or beam coverage. As a scheme of mapping the information transmitted by the base station to the second reference time, the base station may determine the second reference time, and explicitly inform the determined second reference time to the terminal via the satellite. The terminal may receive the second reference time from the base station, and may store and use the received second reference time. Alternatively, the terminal may implicitly determine the second reference time based on the information transmitted by the base station.

On the other hand, if the first estimated value is less than the second reference signal in the step S1104, the terminal may transmit a PRACH preamble to the base station via the satellite (S1105). Meanwhile, when the terminal transmits the PRACH preamble in the RRC idle state, RRC inactive state, or RRC connected state, and the attempt fails, the terminal may retransmit a PRACH preamble to retry the connection. In this case, when retransmitting a PRACH preamble, the terminal may use the previous estimated value used when transmitting the previous PRACH preamble or may use a new estimated value. In the case where the terminal uses the previous estimated value used to transmit the PRACH preamble, it may be set to the most recent value among the previous estimated values used to transmit the previous PRACH preambles within an arbitrary time window. Here, the new estimated value may be the estimated RTT of the service link estimated using a GNSS at the previous nearest timing from a preamble transmission timing (i.e., TPS) for transmitting the PRACH preamble or a sum of the estimated RTT of the service link and the information transmitted by the base station.

Alternatively, the new estimated value may be an average value of the previous estimated values from the previous estimated value used when transmitting the previous PRACH preamble to the estimated value estimated at the previous nearest timing from the PRACH transmission timing for retransmitting the PRACH preamble, or an average value of the previous estimated values within an arbitrary time window from the estimated value estimated at the previous nearest timing from the PRACH transmission timing for retransmitting the PRACH preamble. The arbitrary time window may be determined by the first reference time or second reference time, or may be determined by the existing window parameter (e.g., RA-responsewindow, etc.). Alternatively, the arbitrary time window may be transmitted to the terminal via the satellite by the base station as being included in a new RRC parameter. The terminal may receive the arbitrary time window from the base station via the satellite, and may store and use the received time window. As an example, the preamble transmission timing may be a timing indicated to transmit the PRACH by a higher layer described in the 3GPPP TS 38.213. If the old or new estimated value does not exist in the memory or within the arbitrary time window, the terminal may wait until anew estimated value is estimated, without performing the PARCH transmission.

On the other hand, when the terminal determine the timing of transmitting the PRACH preamble by using only the information transmitted by the base station, not the RTT estimated using a GNSS, the above-described first and second reference times for the preamble transmission may be ignored. Whether to use the RTT estimated by the terminal in the RRC state or inactive state may be configured by the base station through transmission of a parameter indicating whether to use it through MIB, SIB, or DCI signaling. Alternatively, when some or all of the parameters of {THCN, THCM, THWN, THWM} are not configured, the terminal may determine the timing of transmitting the PRACH preamble by using only the information transmitted by the base station. Alternatively, when the transmission timing parameter applied to the timing of transmitting the PRACH preamble is configured, the terminal may determine the timing of transmitting the PRACH preamble by using only the information transmitted by the base station.

3. Timing Update of Terminal and Parameters Related Thereto

After the terminal obtains the RTT or timing advance value with the base station or satellite through initial access, an update may be performed when the RTT or timing advance value is changed due to a movement of the terminal, satellite or base station.

Figure 12:
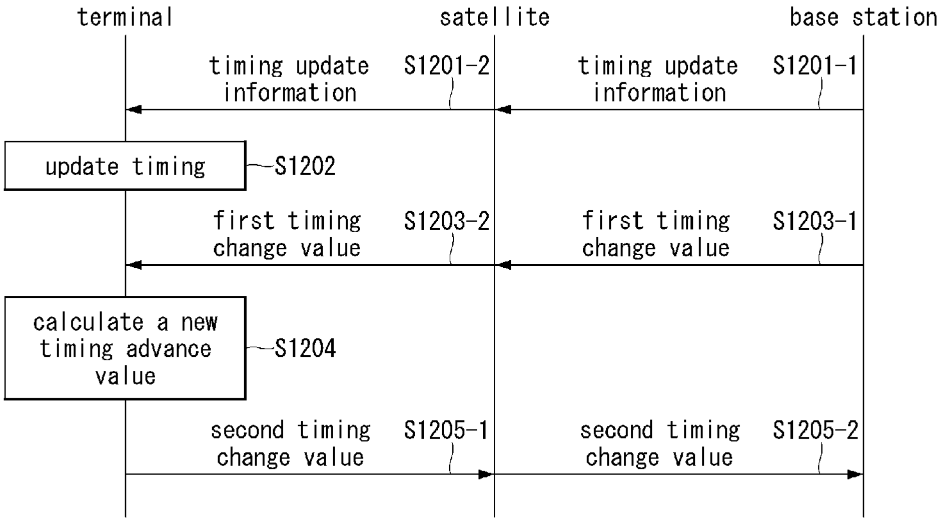
FIG. 12 is a sequence chart illustrating a first exemplary embodiment of a timing update method of a terminal.

FIG. 12 is a sequence chart illustrating a first exemplary embodiment of a timing update method of a terminal.

Referring to FIG. 12, in a timing update method of the terminal, the base station may transmit timing update information including a timing drift rate, a timing of applying the timing drift rate, and a periodicity of updating the timing drift rate to the satellite (S1201-1). Accordingly, the satellite may receive the timing update information from the base station, and transmit the received timing update information to the terminal (S1201-2). Then, the terminal may receive the timing update information from the satellite. Then, the terminal may periodically update a timing advance value according to the timing drift rate from the timing of applying the timing drift rate according to the timing update information received from the base station to obtain an updated timing advance value (i.e., TA_self) (S1202). As described above, the base station may inform the terminal via the satellite through the timing update information that the terminal can update the timing advance value by using the timing drift rate from when to in what period. Here, the base station may inform the timing drift rate according to a movement of the satellite to the terminal via the satellite through SIB, RRC, MAC-CE or DCI signaling. In this case, the timing drift rate may be a cell-specific, beam-specific or terminal-specific parameter, and may be updated through SIB, RRC, MAC-CE or DCI signaling. For example, the timing drift rate for the RTT between the terminal and the satellite may be a terminal-specific parameter, the timing drift rate for the RTT between the satellite and the base station may be a cell-specific or beam-specific parameter. They may be informed from the base station to the terminal, respectively, or only one parameter (e.g., timing drift rate for the RTT between the terminal and the satellite) may be informed. Alternatively, one parameter obtained by summing the timing drift rate for the RTT between the terminal and the satellite and the timing drift rate for the RTT between the satellite and the base station may be informed from the base station to the terminal as a terminal-specific parameter. Here, a case where the satellite and the base station exist separately may be described as an example. However, even when the satellite includes the base station, the above-described procedure may be applicable as being modified.

Meanwhile, the update of the RTT between the terminal and the satellite may be performed using the ephemeris of the satellite and the position of the terminal instead of the timing draft rate. In addition, in updating the RTT between the terminal and the satellite, the base station may transmit a first timing change value to the terminal via the satellite, and the terminal may receive the first timing change value and perform the update.

Accordingly, the base station may transmit the first timing change value to the satellite according to a timing adjustment procedure when the timing with the terminal is changed (S1203-1). Then, the satellite may receive the first timing change value from the base station, and may transmit the received first timing change value to the terminal (S1203-2). Accordingly, the terminal may receive the first timing change value from the satellite. In this case, the base station may transmit a difference value (i.e., the first timing change value) between the previous timing advance value and the current accurate timing advance value to the terminal via the satellite. The terminal may receive the first timing change value via the satellite, and calculate a new timing advance (i.e., TA_new) by adding the first timing change value (i.e., TA_Dif) to the previous timing advance value (i.e., TA_old) (S1204).

On the other hand, in such the situation, when the base station informs the terminal from when to which period the timing drift rate is reflected, the base station may know the updated timing advance (i.e., TA_self), which the terminal updated by reflecting the timing drift rate, at the timing (i.e., T1) of transmitting the first timing change value to the terminal. In this reason, the previous timing advance value (i.e., TA_old) at the timing (i.e., T1) of transmitting the first timing change value may be the most recently updated timing advance value (i.e., TA_self). The base station may transmit the first timing change value (i.e., TA_Dif) that is a difference between the updated timing advance value (i.e., TA_self) and the current timing advance value to the terminal.

Accordingly, the terminal may receive the first timing change value, and store and use the received first timing change value. The terminal may assume the previous timing advance value (i.e., TA_old) as the most recently updated timing advance value (i.e., TA_self) before the timing at which the base station transmits the first timing change value (i.e., T1). Alternatively, the terminal may assume the previous timing advance value (i.e., TA_old) as the most recent timing advance value (i.e., TA_self) before the timing (i.e., T2) at which the terminal receives the first timing change value, and obtain the new timing advance value (i.e., TA_new) by reflecting the first timing change value. Here, the timing of transmitting the first timing change value may be a timing at which the base station transmits the parameter related to an SSB, a CSI-RS, a specific SIB, a time stamp, or a coordinate value.

Meanwhile, the terminal may perform update on its own timing advance value in an aperiodic/periodic/semi-persistent manner. The base station may transmit a parameter triggering a start of the terminal's own update to the terminal as a DCI, MAC-CE or RRC parameter. In this case, a parameter for an update periodicity may be configured as a MAC-CE or RRC parameter. The terminal may update the timing advance value by itself, and after receiving the first timing change value (i.e., TA_Dif) of the base station and updating the timing advance value, the terminal may stop its own update until the terminal receives a parameter triggering a start of the terminal's own update on the timing advance value. Alternatively, the base station may transmit a specific parameter by using a DCI or MAC-CE to stop the terminal's own update. Due to this, the base station may determine activation/deactivation of the terminal's own update on the timing advance value.

The updated timing advance value (i.e., TA_self) may be calculated by terminal by using the timing drift rate or by using the above-described coordinate value or time stamp value along with the position information of the terminal. When the terminal updates the timing advance value by using the ephemeris of the satellite and the position information, the terminal may perform the update at the timing indicated by the base station with the corresponding periodicity. On the other hand, the terminal may receive the first timing change value (i.e., TA_Dif) transmitted by the base station through a timing advance command (i.e., TA command), may calculate a second timing change value (i.e., TA_Ue), which is a difference value from a timing advance value updated by the terminal itself. In addition, the terminal may inform the second timing change value to the base station according to a request of the base station. Alternatively, the terminal may periodically/semi-persistently transmit the second timing change value (i.e., TA_Ue) to the satellite (S1205-1). Then, the satellite may receive the second timing change value from the terminal, and transmit the received second timing change value to the base station (S1205-2). The base station may receive the second timing change value from the satellite.

On the other hand, the base station may update the timing management parameter (i.e., Kof) to generate an updated timing management parameter (i.e., Kof_up). The base station may transmit the timing management parameter (i.e., Kof) to the terminal as a cell-specific, beam-specific parameter. In this regard, the update timing management parameter (i.e., Kof_up) may be updated as a terminal-specific parameter. The base station may obtain an estimated value of the RTT between the terminal and the base station or the RTT between the terminal and the satellite from the terminal. In addition, the base station may transmit a difference value between a timing for allocating a resource position for transmission of the terminal and the timing management parameter (i.e., Kof) to the terminal in consideration of the obtained RTTs through MAC-CE or DCI signaling. The base station may directly inform the difference value, or may transmit a corresponding index of a table after configuring the table for multiple values through RRC signaling. After obtaining the difference value from the timing management parameter (i.e., Kof), the terminal may estimate the updated timing management parameter (i.e., Kof_up) by adding the difference to the timing management parameter (i.e., Kof).

4. Quasi-Co Location (QCL) of Timing Parameters

For the parameters described above, the base station may inform the terminal of an association relationship (i.e., QCL) between a reference signal (RS) and a transmission signal. For all or some of {parameter corresponding to the common delay, parameter corresponding to the coordinate, parameter corresponding to the time stamp, parameter (i.e., Kof) for timing management, and timing drift rate}, the base station may configure a QCL between an RS (e.g., SSB, CSI-RS, or PDCCH DM-RS) and a transmission signal. The corresponding QCL may be included in the existing QCL types (A-D). Alternatively, the corresponding QCL may be defined as a new QCL type (e.g., E). The base station may configure the corresponding QCL through RRC signaling, and may inform it to the terminal through MAC-CE or DCI signaling. The terminal may receive a QCL type corresponding to a specific RS from the base station. In this case, the terminal may recognize that a signal to be transmitted by the base station uses the same timing parameters as the specific RS, and may perform reception or transmission (e.g., of PUCCH/PUSCH) by applying the corresponding timing parameters.

The base station may include a BWP ID in the new QCL type. In this case, the BWP ID may be a beam-specific parameter. When the terminal obtains the QCL type corresponding to a specific RS, the base station may recognize that a signal to be transmitted uses the same BWP as the specific RS, and may switch to the BWP indicated in the QCL to receive or transmit the signal.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A method of a terminal, the method comprising:
receiving a timing drift rate from a base station;
receiving information of a common delay time between a plurality of terminals and the base station from the base station;
transmitting a random access (RA) preamble at a time determined based on the common delay time to the base station;
monitoring to receive a random access response (RAR) in response to the RA preamble from the base station within a window starting after an offset time which is determined based on a delay parameter between the terminal and a satellite;
obtaining a timing advance (TA) value from the base station;
updating the TA value based on the timing drift rate and an ephemeris of the satellite;
calculating a difference value between the TA value and the updated TA value;
transmitting information of the updated TA value which is the difference value to the base station;
performing an uplink communication with the base station based on the updated TA value;
receiving a medium access control (MAC) control element (CE) including additional update information of the updated TA value from the base station;
further updating the updated TA value based on the additional update information; and
performing an uplink communication with the base station based on the further updated TA value.

2. The method of claim 1, wherein the TA value is obtained in an initial access procedure between the terminal and the base station.

3. The method of claim 1, further comprising:
receiving the ephemeris from the base station.

4. The method of claim 1, wherein the TA value is updated based on the ephemeris and position information of the terminal.

5. The method of claim 1, wherein the transmitting the information of the updated TA value is enabled by the base station.

6. The method of claim 1, wherein the updating the TA value is triggered by the base station.

7. The method of claim 1, further comprising:
receiving request information related to the information of the updated TA value from the base station,
wherein the information of the updated TA value is transmitted based on the request information.

8. A method of a base station, the method comprising:
transmitting a timing drift rate to a terminal;
transmitting information of a common delay time between a plurality of terminals and the base station to the terminal;
transmitting an ephemeris of a satellite to the terminal;

receiving a random access (RA) preamble at a time determined based on the common delay time from the terminal;

transmitting a random access response (RAR) in response to the RA preamble to the terminal within a window starting after an offset time which is determined based on a delay parameter between the terminal and the satellite;

receiving information of an updated timing advance (TA) value based on the timing drift rate and the ephemeris from the terminal;

performing an uplink communication with the terminal based on the updated TA value;

transmitting a medium access control (MAC) control element (CE) including additional update information of the updated TA value to the terminal; and performing an uplink communication with the terminal based on a further updated TA value determined by the additional update information, wherein the information of the updated TA value is a difference value between a TA value and the updated TA value, and the TA value is transmitted from the base station to the terminal in an initial access procedure between the terminal and the base station.

9. The method of claim 8, wherein a reporting operation of the information of the updated TA value is enabled by the base station.

10. The method of claim 8, wherein an updating operation of the TA value is performed by the terminal, and the updating operation is triggered by the base station.

11. The method of claim 8, wherein the TA value is updated based on the ephemeris and position information of the terminal.

12. The method of claim 8, further comprising:

transmitting request information related to the information of the updated TA value to the terminal, wherein the information of the updated TA value is received based on the request information.

* * * * *